(12) United States Patent
Heinle

(10) Patent No.: US 7,483,474 B2
(45) Date of Patent: Jan. 27, 2009

(54) STATION COMPRISING A RAKE RECEIVER

(75) Inventor: Frank Heinle, Nuremberg (DE)

(73) Assignee: NXP B.V., Eindhoven (NL)

( * ) Notice: Subject to any disclaimer, the term of this patent is extended or adjusted under 35 U.S.C. 154(b) by 327 days.

(21) Appl. No.: 10/581,809

(22) PCT Filed: Nov. 26, 2004

(86) PCT No.: PCT/IB2004/052570

§ 371 (c)(1),
(2), (4) Date: Jun. 2, 2006

(87) PCT Pub. No.: WO02/01747

PCT Pub. Date: Jun. 3, 2002

(65) Prior Publication Data

US 2007/0127434 A1    Jun. 7, 2007

(30) Foreign Application Priority Data

Dec. 4, 2003 (EP) .................................. 03104548

(51) Int. Cl.
*H04B 1/00* (2006.01)
(52) U.S. Cl. .................. 375/147; 375/150; 455/130
(58) Field of Classification Search .................. 375/148, 375/341
See application file for complete search history.

(56) References Cited

U.S. PATENT DOCUMENTS

| | | | | |
|---|---|---|---|---|
| 6,175,588 B1 * | 1/2001 | Visotsky et al. | ............. | 375/148 |
| 6,456,611 B1 * | 9/2002 | Hu et al. | ............. | 370/342 |
| 6,459,883 B2 * | 10/2002 | Subramanian et al. | ... | 455/67.11 |
| 6,625,197 B1 * | 9/2003 | Lundby et al. | ............. | 375/130 |
| 6,813,309 B1 * | 11/2004 | Ogino | ......................... | 375/148 |
| 7,106,783 B2 * | 9/2006 | Seo et al. | ..................... | 375/148 |
| 7,203,220 B2 * | 4/2007 | Baltersee et al. | ............ | 375/145 |
| 2003/0215003 A1 * | 11/2003 | Bottomley et al. | .......... | 375/148 |

FOREIGN PATENT DOCUMENTS

WO    WO 02/01747    1/2002

OTHER PUBLICATIONS

Kugansesan P et al: "High-Speed Data Transmission With Multicode Modulation and Turbo-Codes for Wireless Personal Communications"; Communication 1997, ICC 97 Montreal, Towards the Knowledge Millennium; 1997 IEEE International Conf. on Montreal Que; Canada Jun. 8-12, 1997, New York; vol. 2, Jun. 8, 1997; pp. 959-963.

\* cited by examiner

*Primary Examiner*—Mark A Robinson
*Assistant Examiner*—Isaak Jama
(74) *Attorney, Agent, or Firm*—Lisa K. Jorgenson; Robert Iannucci; Seed IP Law Group PLLC

(57) ABSTRACT

Stations like mobile terminals, bases stations and network nodes comprising rake receivers with fingers require relatively many calculations to be performed for despreading a symbol. By replacing despreading multipliers, integrators and dumpers in the fingers by Hadamard transformers (62), chips of several symbols with orthogonal channelization codes can be despreaded simultaneously, and the station and the rake receiver have become more efficient. The despreading section (60 of the finger (34) comprises the Hadamard transformer (62) and a serial-to-parallel converter (61) comprising downsamplers (71-73). The station is a high-speed downlink packet access station (HSDPA) in a universal mobile telecommunication system (UMTS), with a number of de-channelization codes used being at least ten percent of a despreading factor used. For example, the despreading factor used is equal to sixteen, with the maximum possible number of de-channelization codes used being equal to five, ten or fifteen, depending on the capability class of the station.

7 Claims, 1 Drawing Sheet

STATION COMPRISING A RAKE RECEIVER

Figure 1:
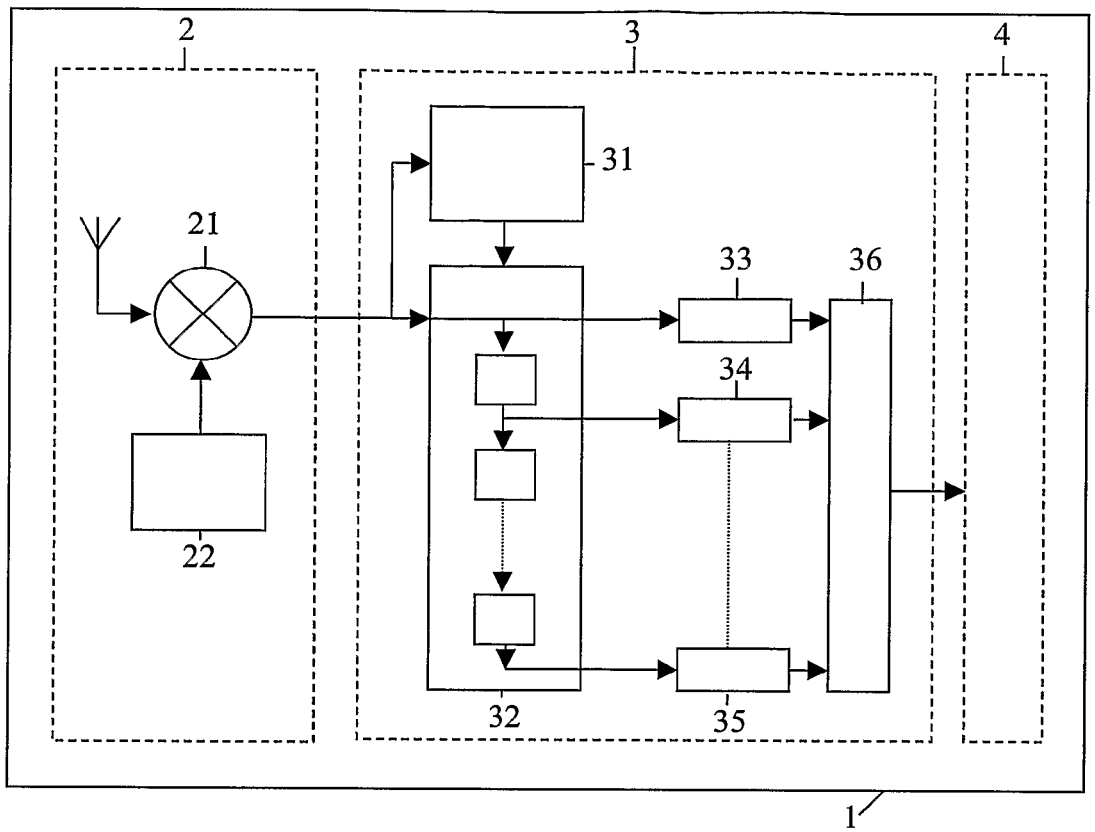

The invention relates to a station comprising a rake receiver with a finger, to a rake receiver for use in a station and comprising a finger, to a finger for use in a rake receiver, to a method for despreading a descrambled signal, and to a processor program product for despreading a descrambled signal.

Examples of such a station are mobile terminals and base stations and network nodes in a Universal Mobile Telecommunication System (UMTS).

A prior art station is known from WO 02/01747, which discloses on its page 2 lines 4-8 a mobile radio device having a rake receiver with fingers.

Rake receivers exploit multipath propagation, which for example exists when a transmitted signal, before receival, is reflected via obstacles, by letting fingers (or rake arms) separately process multipath components of a transmitted signal and by then combining their energies. Thereto, more particularly, said fingers (or rake arms) track and despread the multipath components. Such a rake receiver is for example used in code division multiple access telecommunication systems (CDMA) or wideband code division multiple access telecommunication systems (WCDMA).

With each symbol comprising for example sixteen chips, and with a complex valued multiplication comprising four real valued multiplications and two real valued additions, per finger, for descrambling a symbol, 16 complex valued multiplications which equal 64 real valued multiplications and 32 real valued additions will need to be done, and for despreading a real plus imaginary part of the symbol, 32 real valued multiplications will need to be done per de-channelization code, and for integrating and dumping, 15 complex valued additions which equal 30 real valued additions will need to be done. So, in case of five channels used (five de-channelization codes used), 64+5×32=224 real multiplications and 32+5×30=182 real additions need to be performed, in case of ten channels used (ten de-channelization codes used), 64+10×32=384 real multiplications and 32+10×30=332 real additions need to be performed, and in case of fifteen channels used (fifteen de-channelization codes used), 64+15×32=544 real multiplications and 32+15×30=482 real additions need to be performed (per symbol).

The known station is disadvantageous, inter alia, due to requiring relatively many calculations to be performed for despreading a symbol.

It is an object of the invention, inter alia, to provide a station which requires relatively few calculations to be performed for despreading a symbol.

Furthers objects of the invention are, inter alia, to provide a rake receiver, a finger, a method and a processor program product all requiring relatively few calculations to be performed for despreading a symbol.

The station according to the invention comprises a rake receiver with a finger, which finger comprises a Hadamard transformer.

By introducing a Hadamard transformer, like for example a Fast Hadamard Transformer or FHT, into the finger, chips of several symbols with orthogonal channelization codes can be despreaded simultaneously. Due to the de-channelization codes or spreading codes being so-called Walsh codes which have a structure which is suited to be transformed by a Hadamard transformer, the despreading of a symbol can be done more efficiently. For descrambling a symbol, the station according to the invention still requires 64 real valued multiplications and 32 real valued additions. But for despreading, in case of a spreading factor being equal to 16, the Hadamard transformer of length 16 only requires 64 complex valued additions which equal 128 real valued additions, irrespective of the number of de-channelization codes used. So, summarizing, the station according to the invention is more efficient in terms of multiplications, is more efficient in terms of additions for five or more de-channelization codes used, and is more efficient in overall operations for three or more de-channelization codes used.

It should be noted that WO 02/01747 further discloses on its page 2 the use of a Hadamard transformer in a synchronization section of the rake receiver. This synchronization section searches for channels and identifies an other station, and is not involved in the despreading of the symbols. A finger descrambles and despreads symbols and is not involved in the searching for channels and the identifying of other stations.

An embodiment of the station according to the invention is defined by the finger comprising a descrambling section and a despreading section, which despreading section comprises the Hadamard transformer. As stated above, the de-channelization codes or spreading codes are so-called Walsh codes which have a structure which is suited to be transformed by a Hadamard transformer, contrary to the scrambling codes, which (at the moment) are not suited to be transformed by a Hadamard transformer.

An embodiment of the station according to the invention is defined by the descrambling section comprising a multiplier for multiplying a finger input signal with a complex conjugated scrambling code for descrambling the finger input signal, and by the despreading section further comprising a serial-to-parallel converter for serial-to-parallel converting a descrambled signal, which serial-to-parallel converter comprises downsamplers coupled to inputs of the Hadamard transformer and comprises a selector for generating despreaded symbols per channel, which selector is coupled to outputs of the Hadamard transformer. The serial-to-parallel converter and the downsampler convert the descrambled signal into parallel signals at a reduced sampling rate, and the Hadamard transformer transforms these signals through Hadamard matrix operations into transformed parallel signals, which are supplied to the selector.

Each multiplier, serial-to-parallel converter, downsampler, Hadamard transformer and selector may be a sole hardware unit, a part of a larger hardware unit, a software module or a part of a larger software module. Therefore, an input (output) may be a hardware input (output) or a software input (output).

An embodiment of the station according to the invention is defined by the rake receiver further comprising:
- a further finger;
- a delaying section for delaying a frequency converted signal and for generating the finger signal destined for the finger and a further finger signal destined for the further finger; and
- a synchronization section for receiving the frequency converted signal and for in response controlling the delaying section.

Usually, a station comprises for example three or five fingers. Preferably, each finger has a similar construction, each one based on the Hadamard transformer.

An embodiment of the station according to the invention is defined by the station being a high-speed downlink packet access station in a universal mobile telecommunication system, with a number of de-channelization codes used being at least ten percent of a despreading factor used. The efficiency of the station according to the invention will increase for an increasing percentage of the number of de-channelization codes used with respect to the despreading factor. In a basic situation, with for example three de-channelization codes used in view of a despreading factor of for example 256, in other words with the number of de-channelization codes used being about one percent of the despreading factor used, the Hadamard transformer could still be used, but in this case without increasing the efficiency substantially.

An embodiment of the station according to the invention is defined by the despreading factor used being equal to sixteen, with the maximum possible number of de-channelization codes used being equal to five, ten or fifteen. This high-speed downlink packet access station is expected to become popular in the near future. The maximum possible number of codes is five, ten or fifteen, depending on the capability class of the station.

The rake receiver according to the invention for use in a station and comprising a finger is defined by the finger comprising a Hadamard transformer.

The finger according to the invention for use in a rake receiver is defined by the finger comprising a Hadamard transformer.

The method according to the invention for despreading a descrambled signal comprises a Hadamard transforming step.

The processor program product for despreading a descrambled signal comprises a Hadamard transforming function.

Embodiments of the rake receiver according to the invention and of the finger according to the invention and of the method according to the invention and of the processor program product according to the invention correspond with the embodiments of the station according to the invention.

The invention is based upon an insight, inter alia, that known stations require relatively many calculations to be performed for despreading a symbol, and is based upon a basic idea, inter alia, that Hadamard transformers are suited to transform de-channelization codes or spreading codes in the form of so-called Walsh codes.

The invention solves the problem, inter alia, to provide a station which requires relatively few calculations to be performed for despreading a symbol, and is advantageous, inter alia, in that the station according to the invention is more efficient in terms of multiplications, is more efficient in terms of additions for five or more de-channelization codes used, and is more efficient in overall operations for three or more de-channelization codes used.

These and other aspects of the invention will be apparent from and elucidated with reference to the embodiments(s) described hereinafter.

Figure 2:
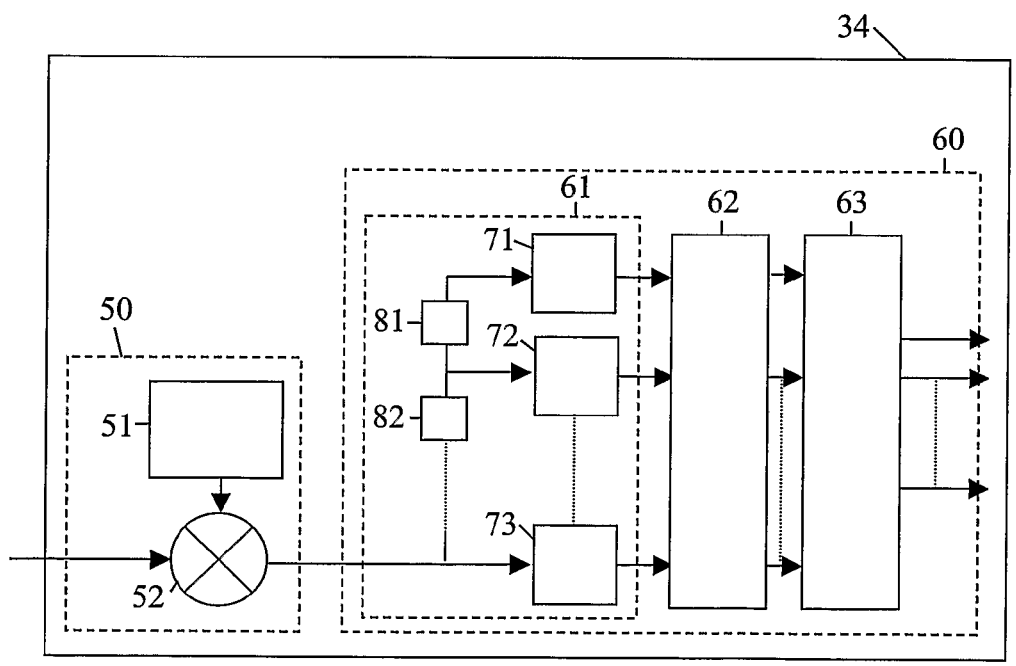

In the drawings:

FIG. 1 shows in block diagram form a station according to the invention comprising a rake receiver according to the invention; and FIG. 2 shows in block diagram form a finger according to the invention comprising a Hadamard transformer.

The station 1 according to the invention as shown in FIG. 1 like for example a mobile terminal or a base station or a network node in a Universal Mobile Telecommunication System (UMTS) etc. comprises a radio stage 2, a rake receiver 3 and a output stage 4. The radio stage 2 comprises an antenna for receiving a radio frequency signal. The antenna is coupled to a first input of a mixer 21 for generating a frequency converted signal. Thereto, a second input of mixer 21 is coupled to an oscillator 22 for receiving an oscillation signal. The rake receiver 3 comprises a synchronization section 31 for receiving the frequency converted signal, and a delaying section 32 for receiving the frequency converted signal, which delaying section 32 is controlled by the synchronization section 31. The rake receiver 3 further comprises fingers 33-35 according to the invention, of which inputs are coupled to outputs of the delaying section 32. Outputs of the fingers are coupled to inputs of a combiner 36, of which an output is coupled to an input of the output stage 4. This output stage 4 for example comprises a processing unit and/or a man-machine-interface all not shown.

The functioning of the station 1 according to the invention as shown in FIG. 1 is of common general knowledge to a person skilled in the art, apart from the construction and functioning of the one or more fingers according to the invention. Such a finger according to the invention is shown in FIG. 2.

The finger 34 according to the invention as shown in FIG. 2 comprises a descrambling section 50 and a despreading section 60. The descrambling section 50 comprises a multiplier 52 for multiplying a finger input signal with a complex conjugated scrambling code for descrambling the finger input signal originating from an output of the delaying section 32. This complex conjugated scrambling code originates from a generator 51. The despreading section 60 comprises a serial-to-parallel converter 61 for serial-to-parallel converting a descrambled signal originating from an output of the multiplier 52. This serial-to-parallel converter 61 comprises downsamplers 71-73. An input of the lowest downsampler 73 receives the serial-to-parallel converted descrambled signal, an input of the one but lowest downsampler receives this signal via a delay block which delays by one cycle, an input of the one but highest downsampler 72 receives this signal via a delay block 82 and all lower delay blocks, each delaying by one cycle, and an input of the highest downsampler 71 receives this signal via a delay block 81 and delay block 82 and all lower delay blocks, each delaying by one cycle. Outputs of the downsamplers 71-73 are coupled to inputs of a Hadamard transformer 62. A selector 63 for generating despreaded symbols per channel at its outputs comprises inputs coupled to outputs of the Hadamard transformer 62. The serial-to-parallel converter 61 and the downsamplers 71-73 convert the descrambled signal into parallel signals at a reduced sampling rate, and the Hadamard transformer 62 transforms these signals through Hadamard matrix operations into transformed parallel signals, which are supplied to the selector 63.

The Hadamard transformer 62 for example comprises a Fast Hadamard Transformer. Usually, the rake receiver 3 comprises three or five fingers 33-35, with a first finger 33 receiving a first finger signal from a first output of the delaying section 32, with a second finger 34 receiving a second finger signal from a second output of the delaying section 32, with a third finger 35 receiving a third finger signal from a third output of the delaying section 32, etc. In delaying section 32, several serial delaying units can be found, with for example a first input of the a first delaying unit forming the first output of the delaying section 32, with a first output of the first delaying unit forming a second output of the delaying section 32, with a first output of a second delaying unit forming a third output of the delaying section 32, etc. Thereby, synchronization section 31 controls a delay of each delaying unit and/or an offset delay and/or the adding/removing of delaying units etc. Preferably, each finger 33-35 will have the same construction.

The signal entering the serial-to-parallel converter 61 is a stream of subsequent chips after descrambling, i.e. a stream of spread/canalized symbols. In case of two codes with a spreading factor equal to four, with code1=1, 1, 1, 1 and code2=1, −1, 1, −1, with symbols s1n, n=0, 1, 2 and s2n, n=0, 1, 2, and with a propagation channel distortion on this finger being gn, n=0, 1, 2 (does not change to much within a symbol), there are twelve subsequent chips as follows:

$g0*(s10+s20), g0*(s10-s20), g0*(s10+s20), g0*(s10-s20), g1*(s11+s21), g1*(s11-s21), g1*(s11+s21), g1*(s11s21), g2*(s12+s22), g2*(s12-s22), g2*(s12+s22), g2*(s12-s22).$

The Hadamard transformer 62 is a block transform, i.e. a grouping of the sixteen subsequent chips of a symbol into a vector of the same length is needed to be able to do the Hadamard transformation.

The signals leaving the downsamplers 71-73 can be constructed as follows, thereby suggesting that there are only three downsamplers 71-73 and two delay blocks 81,82. A data stream like for example . . . , v−1, v0, v1, v2, v3, v4, v5, v6, . . . is supplied to downsampler 73 and via delay block 82 to downsampler 72 and via delay blocks 82,81 to downsampler 81. As a result, downsampler 73 receives an undelayed signal, downsampler 72 receives a signal delayed by one cycle, and downsampler 71 receives a signal delayed by two cycles:

undelayed signal (for downsampler 73): v0, v1, v2, v3, v4, v5, v6 signal delayed by one (downsampler 72): v-1, v0, v1, v2, v3, v4, v5 signal delayed by two (downsampler 71): v-2, v-1, v0, v1, v2, v3, v4

Downsampling by three of these three signals delivers:

downsampler 71: . . . , v-2, v1, v4, . . .

downsampler 72: . . . , v-1, v2, v5, . . .

downsampler 73: . . . , v0, v3, v6, . . .

This delivers a vector of length three (e.g. v=[v1, v2, v3] in the given example) in each cycle which consists of three subsequent input samples of the serial-to-parallel conversion.

The input signals of the Hadamard transformer 62 are vectors of subsequent samples of the input signal according to the signal entering the serial-to-parallel converter 61 discussed above. For a spreading factor equal to four, the input signals would e.g. be vectors:

$v0=[g0*(s10+s20), g0*(s10-s20), g0*(s10+s20), g0*(s10-s20)]$ $v1=[g1*(s11+s21), g1*(s11-s21), g1*(s11+s21), g1*(s11-s21)]$ $v2=[g2*(s12+s22), g2*(s12-s22), g2*(s12+s22), g2*(s12-s22)]$

The output signals of the Hadamard transformer 62 are vectors of the despreaded symbols (still including the channel distortion factor gn). In this case:

$V0=[s10*g0, s20*g0, 0, 0];$ $V1=[s11*g1, s21*g1, 0, 0];$ $V2=[s12*g2, s22*g2, 0, 0];$ with both zeros each time being present due to the two remaining codes being not used. In the given example the Hadamard matrix of length four looks as follows:

| 1 | 1 | 1 | 1 |
| 1 | -1 | 1 | -1 |
| 1 | 1 | -1 | -1 |
| 1 | -1 | -1 | 1 |

The lines/columns of this matrix are the channelization codes, e.g. the two codes used in the example are the first and second column.

As will be clear from the example above, only a subset of the codes (in the example two out of four) might be used. In this case, the other output signals of the Hadamard transformer 62 do not have any meaning, i.e. they can be thrown away. The task of the selector 63 is exactly to do this, i.e. to pick two out of the four output signals in this case. The number of the used codes (=matrix columns) is known in advance since it has been negotiated before, for example with an other station.

The station 1 might be a high-speed downlink packet access station (HSDPA) in a universal mobile telecommunication system (UMTS), with a number of de-channelization codes used being at least ten percent of a despreading factor used. The efficiency of the station 1 according to the invention will increase for an increasing percentage of the number of de-channelization codes used with respect to the despreading factor. In a basic situation, with for example three de-channelization codes used in view of a despreading factor of for example 256, in other words with the number of de-channelization codes used being about one percent of the despreading factor used, the Hadamard transformer 62 could still be used, but in this case without increasing the efficiency substantially. Preferably, the despreading factor used is equal to sixteen, with the maximum possible number of de-channelization codes used being equal to five, ten or fifteen, depending on the capability class of the station. This high-speed downlink packet access station 1 is expected to become popular in the near future.

Each multiplier 52, generator 51, serial-to-parallel converter 61, downsampler 71-73, Hadamard transformer 62 and selector 63 may be a sole hardware unit, a part of a larger hardware unit, a software module or a part of a larger software module. Therefore, an input (output) may be a hardware input (output) or a software input (output). Further (parts of) units and further (parts of) modules may be present without departing from the scope of this invention.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. The mere fact that certain measures are recited in mutually different dependent claims does not indicate that a combination of these measures cannot be used to advantage.

The invention claimed is:

1. Station comprising a rake receiver with a finger, which finger comprises a Hadamard transformer, wherein the station is a high speed downlink packet access station in a universal mobile telecommunication system, with a number of de-channelization codes used being at least ten percent of despreading factor used.

2. Station as defined in claim 1, wherein the finger comprise a descrambling section and a despreading section, which despreading section comprise the Hadamard transformer.

3. Station as defined in claim 2, wherein the descrambling section comprises a multiplier for multiplying a finger input signal with a complex conjugated scrambling code for descrambling the finger input signal, and wherein the despreading section further comprise a serial-to-parallel converter to serial-to-parallel converting a descrambled signal, which serial -to-parallel converter comprises downsamplers coupled to inputs of the Hadamard transformer and comprises a selector for generating despreaded symbols per channel, which selector is coupled to outputs of the Hadamard transformer.

4. Station as defined in claim 3, wherein the rake receiver further comprises:
    a further finger;
    a delaying section for delaying a frequency converted signal and for generating the finger signal destined for the finger and a further finger signal destned for the further finger; and
    a synchronization section for receiving the frequency converted signal and for in response controlling the delaying section.

5. Station as defined in claim 1, wherein the despreading factor used is equal to sixteen, with the maximum possible number of de-channelization codes used being equal to five, ten or fifteen.

6. Rake receiver for use in a station comprising a finger which finger comprises a Hadamard transformer, wherein the station is a high speed downlink packet access station in a universal mobile telecommunication system. with a number of de-channelization codes used being at least ten percent of a despreading factor used.

7. Finger for use in a rake receiver, in a high-speed downlink packet access station with a known number of de-channelization codes, which finger comprises a descrambling section and a despreading section, said despreading section providing an output to a Hadamard transformer, wherein, the number of de-channelization codes used being at least ten percent of a despreading factor used.

* * * * *

UNITED STATES PATENT AND TRADEMARK OFFICE
CERTIFICATE OF CORRECTION

| | |
|---|---|
| PATENT NO. | : 7,483,474 B2 |
| APPLICATION NO. | : 10/581809 |
| DATED | : January 27, 2009 |
| INVENTOR(S) | : Frank Heinle |

It is certified that error appears in the above-identified patent and that said Letters Patent is hereby corrected as shown below:

<u>On the Face of the Patent</u>
Section (57) Abstract, "Stations like mobile terminals, bases stations and network nodes comprising rake receivers with fingers require relatively many calculations to be performed for despreading a symbol. By replacing despreading multipliers, integrators and dumpers in the fingers by Hadamard transformers (62), chips of several symbols with orthogonal channelization codes can be despreaded simultaneously, and the station and the rake receiver have become more efficient. The despreading section (60 of the finger (34) comprises the Hadamard transformer (62) and a serial-to-parallel converter (61) comprising downsamplers (71-73). The station is a high-speed downlink packet access station (HSDPA) in a universal mobile telecommunication system (UMTS), with a number of de-channelization codes used being at least ten percent of a despreading factor used. For example, the despreading factor used is equal to sixteen, with the maximum possible number of de-channelization codes used being equal to five, ten or fifteen, depending on the capability class of the station." should read as -- Stations like mobile terminals, bases stations and network nodes comprising rake receivers with fingers require relatively many calculations to be performed for despreading a symbol. By replacing despreading multipliers, integrators and dumpers in the fingers by Hadamard transformers, chips of several symbols with orthogonal channelization codes can be despreaded simultaneously, and the station and the rake receiver become more efficient. The despreading section of the finger comprises the Hadamard transformer and a serial-to-parallel converter comprising downsamplers. The station is a high-speed downlink packet access station (HSDPA) in a universal mobile telecommunication system (UMTS), with a number of de-channelization codes used being at least ten percent of a despreading factor used. For example, the despreading factor used is equal to sixteen, with the maximum possible number of de-channelization codes used being equal to five, ten or fifteen, depending on the capability class of the station. --

<u>Column 6</u>
Lines 62-63, "of de-channelization codes used being at least ten percent of despreading factor used." should read as -- of de-channelization codes used being at least ten percent of a despreading factor used. --

Lines 64-66, "wherein the finger comprise a descrambling section and a despreading section, which despreading section comprise the Hadamard" should read as -- wherein the finger comprises a descrambling section and a despreading section, which despreading section comprises the Hadamard --

UNITED STATES PATENT AND TRADEMARK OFFICE
CERTIFICATE OF CORRECTION

PATENT NO. : 7,483,474 B2
APPLICATION NO. : 10/581809
DATED : January 27, 2009
INVENTOR(S) : Frank Heinle It is certified that error appears in the above-identified patent and that said Letters Patent is hereby corrected as shown below:

Column 7
Line 5, "despreading section further comprise a serial-parallel" should read as
-- despreading section further comprises a serial-parallel --

Column 7
Line 17, "finger and further finger signal destned for the further" should read as
-- finger and further finger signal destined for the further --

Column 8
Line 17, "providing an output to a Hadamard transformer, wherein, the" should read as
-- providing an output to a Hadamard transformer, wherein the --

Signed and Sealed this

Second Day of June, 2009

JOHN DOLL
*Acting Director of the United States Patent and Trademark Office*